US005580832A

United States Patent [19]

Malghan et al.

[11] Patent Number: 5,580,832
[45] Date of Patent: Dec. 3, 1996

[54] METHOD FOR OBTAINING HIGH DENSITY GREEN CERAMICS FROM POWDERS

[75] Inventors: Subhaschandra G. Malghan; Ramannair S. Premachandran, both of Gaithersburg, Md.

[73] Assignee: The United States of America as represented by the Secretary of Commerce, Washington, D.C.

[21] Appl. No.: 430,138

[22] Filed: Apr. 26, 1995

Related U.S. Application Data

[63] Continuation of Ser. No. 176,668, Jan. 3, 1994, abandoned.

[51] Int. Cl.$^6$ .................................................. C04B 35/01
[52] U.S. Cl. ............................... 501/1; 501/88; 501/94; 501/97; 501/103; 501/126; 501/127; 501/133; 501/134; 501/154; 423/348
[58] Field of Search .................................. 501/88, 95, 97, 501/98, 127, 134, 103, 154, 1, 133, 126, 94; 423/348

[56] References Cited

U.S. PATENT DOCUMENTS

| | | | |
|---|---|---|---|
| 4,522,958 | 6/1985 | Das et al. | 523/212 |
| 4,789,140 | 12/1988 | Lirones | 266/238 |
| 4,816,182 | 3/1989 | Novich et al. | 252/313.1 |
| 4,832,939 | 5/1989 | Menashi et al. | 423/598 |
| 4,845,062 | 7/1989 | Burn | 501/136 |
| 4,889,670 | 12/1989 | Gurak et al. | 264/50 |
| 4,904,411 | 2/1990 | Novich et al. | 252/309 |
| 4,935,844 | 6/1990 | Burn | 361/321 |
| 4,968,460 | 11/1990 | Thompson et al. | 264/6 |
| 4,970,181 | 11/1990 | Pearson | 501/127 |
| 5,102,592 | 4/1992 | McCauley et al. | 264/56 |
| 5,116,790 | 5/1992 | Bruno et al. | 501/139 |
| 5,167,271 | 12/1992 | Lange et al. | 164/103 |
| 5,279,994 | 1/1994 | Kerkar | 501/94 |

*Primary Examiner*—Anthony Green
*Attorney, Agent, or Firm*—Leydig Voit and Mayer Ltd

[57] ABSTRACT

A method of forming a highly dispersed ceramic powder slurry is provided comprising forming an aqueous based slurry of a ceramic powder and a polyelectrolyte at an acidic pH and adjusting the pH of the slurry to an alkaline value.

35 Claims, 1 Drawing Sheet

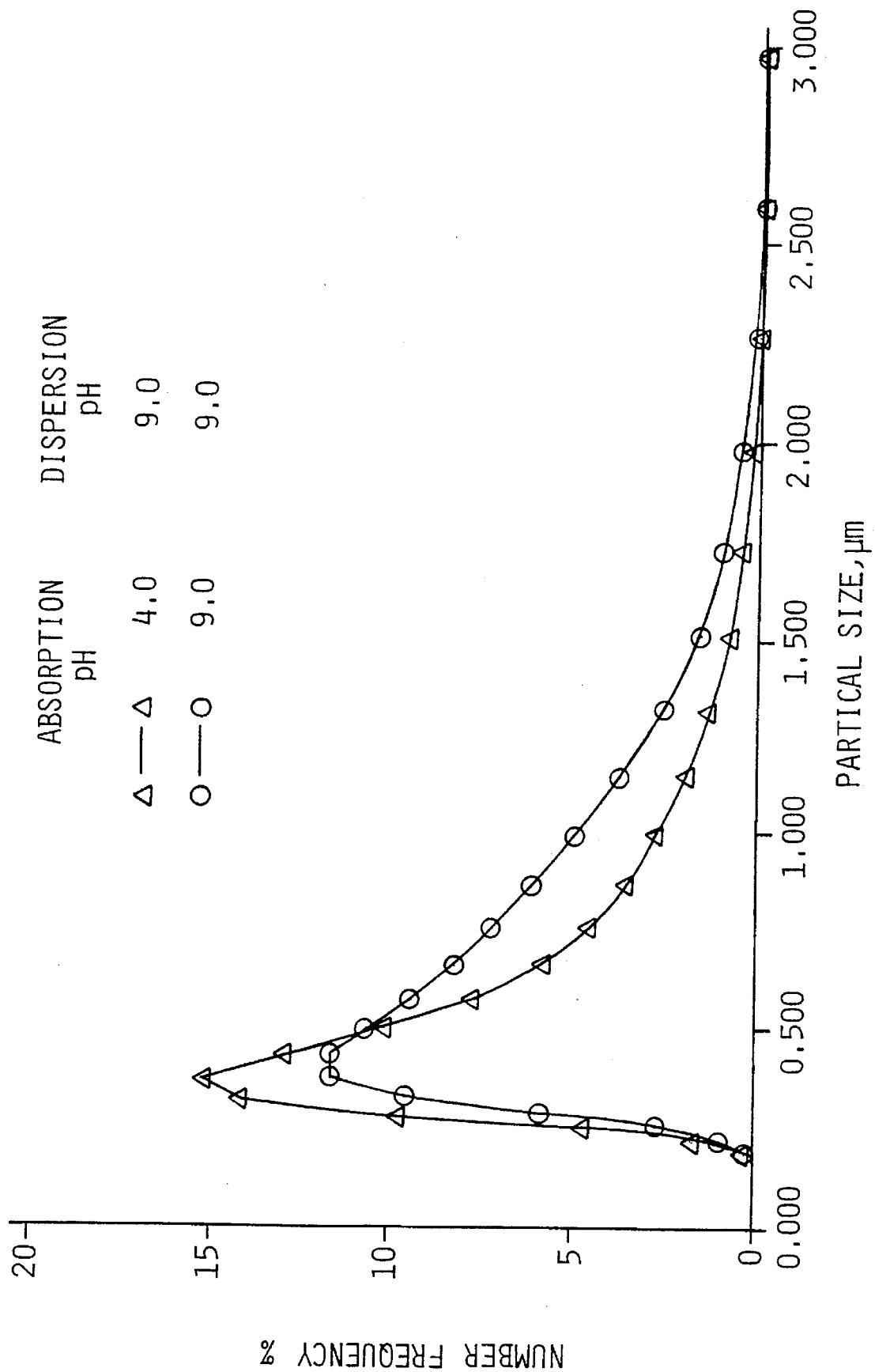

METHOD FOR OBTAINING HIGH DENSITY GREEN CERAMICS FROM POWDERS

This is a continuation of application Ser. No. 08/176,668, filed on Jan. 3, 1994, now abandoned.

BACKGROUND OF THE INVENTION

1. Field of the Invention

The present invention is directed to a method of preparing green ceramic materials. More particularly, the present invention is directed to a method of preparing green ceramic materials from slurries of fine ceramic powders in which the particles of the ceramic materials show little tendency to agglomerate in the slurries, and the resulting ceramic products have higher green and reproducible densities.

2. Discussion of Related Art

Several methods are currently employed for processing particles of powders, typically fine particles, used to form ceramic articles. One of the most commonly used techniques involves the formation of a slurry of such fine particles (hereinafter referred to as "ceramic powders") which is subsequently subjected to a treatment step in which the liquid that forms part of the slurry is removed and a green ceramic article of the desired configuration is formed. Beside the ceramic powder, such slurries typically include a polar solvent, such as water, and a pH modifier and/or a polyelectrolyte. A polyelectrolyte is a macromolecule which becomes charged when placed in certain liquids.

Ceramic powders preferred in forming high density ceramic articles tend to form agglomerates due to van der Waals attractive forces. Accordingly, one or more of the above-mentioned components is added to the liquid or solvent from which the slurry is formed to provide the appropriate repulsive forces between the particles and thereby minimize formation of agglomerates. To achieve this, many practitioners prefer the combination of a polyelectrolyte, preferably a negatively charged polyelectrolyte, and a source of hydroxide ions. The presence of the polyelectrolyte, in ionic form, on the surface of the particles, appears to provide the necessary repulsive forces to reduce agglomerates formation.

Typically, ceramic powders are dispersed with a polyelectrolyte in aqueous solution adjusted to a pH of 8 to 10 and subsequent processing is performed at this pH. In the presence of such electrolyte in water at an acidic pH, dispersion of the ceramic particles does not take place but is supplanted by flocculation of the particles. Flocculation of the slurries makes them difficult to process and also lowers their green and ultimate densities.

SUMMARY OF THE INVENTION

The present invention relates to a process of forming slurries of ceramic powders in which the powders are dispersed to a greater extent in the liquid component of the slurry. As a result, the ceramic products demonstrate higher green density as well as more reproducible densities of the ultimate products.

The method of the present invention which provides the highly dispersed ceramic powder slurries and the concomitant properties of the products formed therefrom includes forming an aqueous-based slurry of a ceramic powder and a polyelectrolyte at an acidic pH and thereafter adjusting the pH of the slurry to an alkaline value. Preferably, the resulting slurry is exposed to a treatment for reducing the size and/or number of agglomerates of ceramic powder.

BRIEF DESCRIPTION OF THE DRAWING

FIG. 1 is a graphical representation comparing particle sizes of silicon nitride powder particles with respect to weight distributions measured in terms of percentages of slurries formed according to a conventional process and a process of the present invention.

DESCRIPTION OF THE PREFERRED EMBODIMENTS

The present invention is directed to a method of forming highly dispersed ceramic powder slurries used in the preparation of green ceramic articles. Because of enhanced dispersion, these slurries produce higher green densities and result in fully dense ceramic products. Furthermore, consistent and reproducible results may be obtained in the production of both the green and resulting ceramic materials and products since the dispersion is reproducible.

The method of the present invention may be employed with any process employing slurries of fine powder particles of substances typically used to make ceramics. As used herein, terms such as "ceramic materials", "ceramic articles", and the like, commonly refer to substances, materials, and/or articles commonly defined as "ceramics" or products resulting from processes used to form such ceramics or to articles formed thereof the term "ceramic", used in the singular or plural, has the meaning attributed to the term by those of ordinary skill in the ceramic arts or the meaning ascribed to the term by an organization such as the American Ceramic Society or by text books or technical dictionaries, such as "The Condensed Chemical Dictionary", Tenth Edition, page 213, van Nostrand Reinhold Company, Inc., New York, N.Y. (1981).

The Components:

Any materials suitable for use in preparing a ceramic which is substantially unreactive or insoluble in acidic or alkaline solutions under the conditions employed in the present invention are suitable for use in the invention. It is most important that such substances are unreactive under acidic conditions, particularly within the acid pH range of the present invention. The materials suitable for use as the ceramic powders of the present invention generally include inorganic substances. Substantially unreactive binary or ternary "carbides" are included in such a classification for purposes of this invention. Particularly included are all ceramic powders that are conventionally processed using anionic polyelectrolytes. Examples of such ceramic powders includes, but are not limited to alumina, titania, zirconia, silica, silicon nitride, and silicon carbide. Silicon powder also may be used.

There is no limitation on the particle sizes of the ceramic powders which are suitable for use in the present invention. Thus, particle sizes typically used in forming conventional ceramic powders slurries may be employed in the present invention. This would normally range between about 10 nanometers to 100 micrometers. Preferably, particle sizes of about 0.1 to about 10 micrometers are employed.

Polyelectrolytes are macromolecules that become charged when placed into an appropriate liquid. In the present invention, aqueous-based liquids are employed and water alone and alcohol-containing water solutions are preferred as the liquid phase. Water is the preferred liquid used to form the slurries of this invention. Suitable polyelectrolytes are those which become charged when placed in the aqueous-based liquids of the present invention. These include, but are not limited to polyacrylic acid, polymethacrylic acid, as well as salts thereof, as for example the ammonium and alkali metal salts, such as the sodium and potassium salts, polyacrylamide, hydrolyzed polyacrylamide, polystyrene sulfonate, polydiallyldimethyl ammonium compounds, and the like. Generally preferred are anionic polyelectrolytes. Preferred as the polyelectrolytes are polymethacrylic acid (PMA) and polyacrylic acid (PAA), and salts thereof, with PMA and its salts, particularly the ammonium salt, being most preferred. A polyelectrolyte particularly preferred in the present invention is the ammonium salt of polymethacrylic acid, available from Vanderbilt Chemical Company under the tradename of DARVAN C. While the preferred polyelectrolytes, PMA and PAA, are referred to as acids, they exist in the aqueous-based liquids of the present invention in either the acid or basic (anionic) form depending on the pH of the liquid. Thus, while being referred to as acids, it should be understood that these terms include both the acidic and anionic forms, depending on the pH of the liquids in which they are placed.

Polyelectrolytes used in the present invention, and particularly PMA, have weight average molecular weights of about 2,000 to about 50,000 grams per mole, preferably about 10,000 grams per mole.

Depending upon which step of the method of this invention is being practiced, an acidic or basic pH modifier will be employed. In the step of adjusting the pH of the liquid or slurry to an acidic value, a strong, preferably inorganic acid which does not adversely react with or affect either the ceramic powder or polyelectrolyte, or any other material which may be present under the conditions in which this invention is practiced is suitable as the acid-modifying agent or acidic pH modifier. Preferred are mineral acids, such as nitric acid, hydrochloric acid, sulfuric acid or phosphoric acid. Nitric acid is particularly preferred. The acid-modifying agent is used to adjust the pH to a value of about 3 to about 6. Preferably a pH of about 3.5 to about 4.5 is employed and most preferably a pH of about 4 is used. At a pH of about 2 or below, some materials used in the invention may dissolve too readily.

Suitable for use as the basic pH-modifying or alkaline agent is any material which is capable of adjusting the aqueous-based liquid or slurry to a basic pH without adversely affecting or reacting with any of the components, such as the ceramic powder or polyelectrolyte, of the slurry. Preferable are strong inorganic bases, such as ammonium hydroxide, sodium hydroxide, potassium hydroxide and sodium carbonate. Preferred as the alkaline-pH modifying agent is ammonium hydroxide. The slurry is adjusted in the second or alkaline-adjusting step to a pH value of about 8 to about 11. Preferably, the pH value should be adjusted in this step to a value of about 9 to about 10, most preferably to a value of about 9.

The Method:

The method according to the present invention may be conducted in several steps or procedures. In the first step, an aqueous slurry is prepared at a pH of about 3 to about 6 by combining a ceramic powder, such as silicon nitride or alumina powder, with a dilute aqueous solution of an acid, such as nitric acid, adjusted to the desired pH. The polyelectrolyte, such as PMA, is combined with the slurry and stirred. Stirring is continued for a period of about 5 minutes to about 1 hour, preferably about 30 minutes, to allow the PMA, present primarily in its nonionized acidic form, to establish adsorption equilibration. Alternatively, the polyelectrolyte could be combined with the aqueous acidic solution adjusted to the appropriate pH value and thereafter the ceramic powder added to the polyelectrolyte-containing solution. Again, equilibration adsorption of the polyelectrolyte between the liquid phase and the solid surface of the ceramic powder is allowed to proceed.

The next procedure involves adjusting the pH of the slurry to a value of about 8 to about 11 with the appropriate alkaline pH-adjusting agent. Accordingly, a solution of the appropriate pH adjusting agent, such as dilute ammonium hydroxide, is combined with the acidic slurry slowly until the appropriate pH is reached.

It is preferable after adjusting the pH of the slurry to the desired alkaline value and stirring the mixture to provide for adsorption equilibration to break up remaining agglomerates into primary particles. Any method typically used in known procedures may be employed. Thus, a milling or tumbling technique may be used. Preferably, however, an ultrasonic treatment is employed. This may include an ultrasonic bath or, preferably, using a transducer in the form of a probe inserted into a beaker of the slurry may be employed. The ultrasonic device is preferably adjusted to operate for about 3 to 30 minutes, most preferably about 10 minutes, at a power setting sufficient to cause the slurry to deagglomerate in the time during which treatment is performed.

If desired, after adjusting the pH value to the proper alkalinity, and preferably after a subsequent treatment to further reduce agglomerates in the slurry, additional ceramic powder may be added.

When forming the acidic slurry, the concentration of the ceramic powder is, by weight, about 5% to about 80%, based on the total weight of liquid and ceramic powder. Preferably, the acid containing slurry should have a concentration of ceramic powder of about 40% to about 50%, most preferably about 50% by weight. As indicated above, additional ceramic powder may be added at a later stage in the method according to this invention. The amount of powder which may be added depends on the specific ceramic powder employed, the surface area of the powder, the particular polyelectrolyte employed and the molecular weight of the polyelectrolyte.

The amount of polyelectrolyte employed in the present invention will also vary with the particular ceramic powder, the surface area of the particular ceramic powder, the particular polyelectrolyte, and the molecular weight of the polyelectrolyte employed. Suitable surface areas for the ceramic powders of this invention are about 0.2 $m^2/g$ to about 100 $m^2/g$ preferably about 10 $m^2/g$. For a ceramic powder having a surface area of about 10 $m^2/g$ surface area, the amount of polyelectrolyte employed, by weight, is about 250 to about 10,000 parts/1,000,000 parts of ceramic powder. Preferably, the amount of polyelectrolyte employed is about 1,500 parts/1,000,000 parts of ceramic powder. If a ceramic powder having a surface area less than 1 $m^2/g$ is used, less polyelectrolyte is employed. There appears to be a somewhat direct correlation between the surface area of the ceramic powder and the concentration of polyelectrolyte. However, the exact amount of polyelectrolyte to be employed must be determined in each situation. The method of the present invention is equally applicable to silicon powder slurries.

Tables I, Ia and II provide data relating to slurries prepared according to a conventional method as well as the method of the present invention. In the slurries for which data are reported in Tables I and Ia, silicon nitride obtained from Ube Industries, having a designation SNE-10 with a particle size of 0.5 μm and a surface area of 10 m$^2$/g and a PMA polyelectrolyte were employed. In the slurry for which data are presented in Table I, the concentration of silicon nitride was 20% by weight, based on the combined weight of liquid phase and silicon nitride, and the concentration of PMA was 1,500 ppm. In the slurry for which data are reported in Table Ia, the concentration of silicon nitride was 45% by weight, based on the total weight of the liquid phase and silicon nitride, and the concentration of PMA was 3,000 ppm based on the concentration of silicon nitride.

Table II provides data for a slurry prepared from alumina available from Alcoa Company as "A-16" having a particle size of 0.4 μm and a surface area of 10 m$^2$/g.

The alumina was present in a concentration of 60% by weight, based on the combined weight of alumina and the liquid phase, and a concentration of PMA of 6,000 ppm, based on the ppm of alumina.

ticles, the slurry prepared in accordance with the present invention has particles with smaller particle sizes.

It may be noted from the data presented in Tables I, Ia and II that below about 0.5 μm there are many more particles in the slurry prepared in accordance with the present invention of a specified particle size than with a method using only an alkaline pH. At particle sizes above about 0.5 μm, at any specified particle size, there are a greater number of particles in the slurry prepared by the conventional method.

The data presented in FIG. 1 and in Tables I, Ia, and II with regard to the percentage of particles of a particular particle size were obtained by a gravity sedimentation method in which the slurry is passed through an X-ray beam and the sedimentation rate is determined by Stoke's law. The green density is determined directly by a measurement of the volume and weight of the green cast body. The percent theoretical density is determined by dividing the green

TABLE I

Silicon Nitride, Ube SNE-10, 20% wt., 1500 ppm PMA

| Procedure | $d^*_{90}$ | $d_{75}$ | $d_{50}$ | $d_{25}$ | $d_{10}$ | Green Density, g/cm$^3$ | % Theoretical Density |
|---|---|---|---|---|---|---|---|
| Conventional (pH of 9) | 1.02 | 0.72 | 0.50 | 0.36 | 0.30 | 1.99 | 50.0 |
| Improved (pH of 4/pH of 9) | 0.82 | 0.56 | 0.40 | 0.32 | 0.27 | 2.23 | 59.5 |

TABLE Ia

Silicon Nitride, Ube SNE-10, 45% wt., 3,000 ppm PMA

| Procedure | $d^*_{90}$ | $d_{75}$ | $d_{50}$ | $d_{25}$ | $d_{10}$ | Green Density, g/cm$^3$ | % Theoretical Density |
|---|---|---|---|---|---|---|---|
| Conventional (pH of 9) | 1.02 | 0.72 | 0.50 | 0.37 | 0.30 | 1.99 | 63.4 |
| Improved (pH of 4/pH of 9) | 0.84 | 0.70 | 0.41 | 0.33 | 0.27 | 2.23 | 71.0 |

TABLE II

Alumina ALCOA-16, wt., 6,000 ppm PMA

| Procedure | $d^*_{90}$ | $d_{75}$ | $d_{50}$ | $d_{25}$ | $d_{10}$ | Green Density, g/cm$^3$ | % Theoretical Density |
|---|---|---|---|---|---|---|---|
| Conventional (pH of 9) | 1.69 | 0.55 | 0.39 | 0.32 | 0.27 | 2.69 | 67.9 |
| Improved (pH of 4/pH of 9) | 1.63 | 0.54 | 0.38 | 0.31 | 0.26 | 2.83 | 71.5 |

$d_i$ - % weight of powder small than stated size in μm

FIG. 1 is a graphical representation of the data presented in Table I. It is thus a cumulative representation of the percentage, by weight, of particles of silicon nitride powder (measured on the abscissa) having particle sizes smaller than a specified size (measured on the ordinate). As may be seen from either Table I or FIG. 1, in a conventional slurry which is prepared at an alkaline pH and adjusted to a value of 9.0, as compared to a slurry prepared in accordance with the present invention in which an acidic slurry (adjusted to an acidic pH using nitric acid) is adjusted to a pH of 9.0 using ammonium hydroxide, at any particular percentage of pardensity of the cast by the actual density of the ceramic powder material.

Example I:

Silicon nitride powder (Ube SNE-10) containing 95% alpha phase and a mean particle size of 0.5 μm was used for slurry preparation. The pH of 11 g of water was adjusted to 4.0 by adding dilute HNO$_3$. To the stirred solution, 875 ppm of ammonium polymethacrylate (Darvan C) was added and pH readjusted to 4.0. The solution was stirred after adding 9 g silicon nitride. The slurry was kept stirred for 1 hour for the adsorption to equilibrate. The pH of the slurry was slowly shifted from 4.0 to 9.5 by adding $NH_4OH$ drop by drop. The slurry was sonicated at 90 watts for 9 minutes. Overheating was avoided by cooling the sample at 3 minute intervals in an ice water-bath. The dispersed sample was slip cast using cylindrical plastic molds of 12.6 mm diameter and 20 mm height. The sample was allowed to dry in air for 24 hours; when dried the cast was released from the mold and further dried for 12 hours at 323° K. in a vacuum oven. The weight and dimensions of the dry green ware were determined. The percentage of theoretical density was calculated using 3.2 g/cm$^3$ as the theoretical density of silicon nitride.

Green density=2.23 g/cm$^3$

% Theoretical density=71.0

Comparative Example I:

To 11 g of water, 875 ppm of Darvan C was added. To this solution, a 9 g sample of the silicon nitride powder used in Example I was added and the pH of the slurry was adjusted to 9.0 by adding $NH_4OH$. This slurry was sonicated for 9 minutes at 90 watts. The power input was approximately 90 watts per 20 cm$^3$ slurry, which is the same as in the method described in Example I. The dispersed sample was slip cast and green density was measured as described above.

Green density=1.99 g/cm$^3$

% Theoretical density=63.4

Example II:

Silicon nitride powder supplied by Denka (Denka P21 B), having a mean particle size of 0.7 μm, was used for the slurry processing. Experimental conditions and methods were the same as those used in Example I.

Green density=2.04 g/cm$^3$

% Theoretical density=63.5

Comparative Example II:

Silicon nitride powder supplied by Denka (Denka P21 B) was used for the slurry processing. Experimental conditions and methods were the same as those used in Comparative Example I.

Green density=1.84 g/cm$^3$

% Theoretical density=57.1

Example III:

Silicon nitride powder supplied by Starck, LC-10, having a mean particle size of 0.6 μm, was used for the slurry processing. Experimental conditions and methods were the same as those used in Example I.

Green density=1.96 g/cm$^3$

% Theoretical density=60.9

Comparative Example III:

Silicon nitride powder supplied by Starck, LC-10 was used for the slurry processing. Experimental conditions and methods were the same as those used in Comparative Example I.

Green density=1.78 g/cm$^3$

% Theoretical density=55.2

Example IV:

Alumina obtained from Alcoa Company (A-16) having a mean particle diameter of 0.4 μm was used for slurry preparation. The pH of 8 g of water was adjusted to 4.0 by adding dilute $HNO_3$. To the stirred solution, 1200 ppm Darvan C was added and the pH readjusted to 4.0. The solution was mechanically stirred after adding 12 g alumina. The sample was kept stirred for 1 hour for the adsorption to equilibrate. The pH of the slurry was slowly increased to 9.5 and the slurry was sonicated and cast by the same procedure described in Example I.

Green density=2.83 g/cm$^3$

% Theoretical density=71.5

Comparative Example IV:

Alumina obtained from Alcoa Company (A-16) having a mean particle diameter of 0.4 μm was used for slurry preparation. To 8 g of water was added, with stirring, 1200 ppm Darvan C and the pH was adjusted to 9.0 with $NH_4OH$. The solution was mechanically stirred after adding 12 g alumina. The sample was kept stirred for 1 hour for the adsorption to equilibrate. The slurry was sonicated and cast by the same procedure described in Comparative Example I.

Green density=2.69 g/cm$^3$

% Theoretical density=67.9

Example V:

Alumina AKP-50, supplied by Sumitomo Chemical Corp., having a mean particle size of 0.2 μm, was used for processing the slurry. The method of processing and casting was similar to that of Example IV.

Green density=2.97 g/cm$^3$

% Theoretical density=75.7

Comparative Example V:

Alumina AKP-50, Sumitomo Chemical Corp., was used for processing the slurry. The method of processing and casting was similar to that of Comparative Example IV.

Green density by improved method=2.73 g/cm$^3$

% Theoretical density=69.7

As indicated above, conventional ceramic powder slurries have been used which contain not only the ceramic powder and a liquid medium, but also a pH modifier and/or a polyelectrolyte. The formation of agglomerates and the degree of individual separation of the powder particles differs in each of these based on the particular ceramic powder material, the electrolyte employed, the pH of the slurry, and, as discussed in part herein, the manner in which the slurry is prepared. For example, a slurry containing a liquid medium, ceramic powder, and a pH modifier, but no polyelectrolyte, tends to demonstrate a higher proportion of dispersed particles in an acidic pH. At basic pH values, such a slurry tends to exhibit flocculation behavior.

Although not wishing to be held to a particular theory, it is believed that conventional slurries containing an alkaline pH modifier and a polyelectrolyte combined with the ceramic powder and liquid phase at a pH of about 9 to 10 demonstrate a different mechanism of adsorption and conformation behavior of the polyelectrolytes in suspensions. For example, the conformation measured by Fourier Transform Infrared (FTIR) Spectroscopy, electroacoustics, and absorption isotherms demonstrates that anionic polyelectrolytes such as PMA ions are present in a stretched mode which are highly negatively charged due to strong ionization. As a result, their adsorption on negatively charged particles of a ceramic powder, such as silicon nitride, is not possible by electrostatic attraction. Most of the dispersion effect attributable to the PMA ions is due to steric influence and the resulting repulsion of particles occurs by an electrosteric mechanism. As additional particles of ceramic powder are added to such a slurry, the effectiveness of repulsive interaction of the PMA polyelectrolyte diminishes.

The reactive adsorption which occurs in the method according to the present invention is believed to proceed by a different mechanism. Also not wishing to be held to a particular theory, however, it is believed that at a pH of about 4, the PMA polyelectrolyte is mostly uncharged and is adsorbed on ceramic powder particles, such as silicon nitride particles, by hydrogen bonding in a flat conformation. During the equilibration period of the present invention, at a pH of 4, over 50% of the PMA added is adsorbed on particles primarily in its uncharged acidic state. When the pH of this slurry is increased to a value of about 9.5, the PMA molecules which had previously been adsorbed completely ionize and attain a stretched conformation which approaches linearity. This occurs due to the repulsive interaction of negative charges on the PMA backbone. As stretching of PMA ions is fully accomplished, the particles tend to attain a dispersed state. Thus, the most significant difference between the process of the present invention and the conventional process of forming slurries with an alkaline pH modifier and polyelectrolyte is that, in the method according to the present invention, a large portion of the PMA which was adsorbed at an acidic pH remains adsorbed on the particle surfaces and fully participates in interparticle repulsion under alkaline conditions. Another advantage is that, since a large number of particles have an adsorbed layer of PMA, additional ceramic powder particles can be added after equilibration has occurred under basic pH conditions to increase the total solids content of the slurry without significantly affecting the dispersion status.

Under conditions of forming a ceramic powder slurry with PMA at a pH of 9, less than about 1.0% of the PMA is adsorbed on the surface of the powder particles. This may be contrasted with the present invention in which about 50% of the PMA used is adsorbed on the surface of the powder particles at a pH of about 4 when all other conditions and concentrations are substantially the same. When the pH of the aqueous slurry is changed from about pH 4 to about pH 9, about 10 to about 15% of the PMA remains adsorbed on the surface of the powder particles. Since the process according to this invention results in significantly more PMA being adsorbed on the surface of ceramic powder particles, the dispersive interaction between the particles is much stronger. Therefore, the primary particles having polyelectrolyte adsorbed thereon, once formed, tend to remain in suspension as individual particles. Furthermore, the adsorbed layer of PMA prevents ultrafine particles in the suspension from forming agglomerates with each other or with the larger polyelectrolyte-adsorbed particles. The combined effect of these two factors leads to enhanced packing of particles in which the ultrafine particles occupy interstitial sites. This is the most significant effect of the reactive adsorption process according to the present invention which leads to high green density of ceramics after removal of the liquid phase.

What is claimed is:

1. A method of forming a highly dispersed ceramic powder slurry comprising:

(a) forming an aqueous-based slurry of ceramic powder and a polyelectrolyte at an acidic pH;

(b) adjusting the pH of the slurry to an alkaline value to provide an alkaline aqueous-based slurry; and (c) treating the slurry to provide for adsorption equilibration to reduce the size and number of agglomerates in the alkaline slurry to thereby form a highly dispersed slurry, wherein the polyelectrolyte is adsorbed on the surface of the ceramic powder while the aqueous-based slurry is at an acidic pH.

2. A method of forming a highly dispersed ceramic powder slurry according to claim 1 wherein the slurry is formed at an acidic pH by mixing the ceramic powder with an aqueous based liquid containing an acid and thereafter adding the polyelectrolyte to the acidic aqueous based liquid containing ceramic powder.

3. A method of forming a highly dispersed ceramic powder slurry according to claim 1 wherein the slurry is formed at an acidic pH by mixing the polyelectrolyte with an aqueous based liquid containing an acid and thereafter adding the ceramic powder to the acidic aqueous based liquid containing polyelectrolyte.

4. A method of forming a highly dispersed ceramic powder slurry according to claim 1, wherein the polyelectrolyte is anionic.

5. A method of forming a highly dispersed ceramic powder slurry according to claim 1, wherein the polyelectrolyte is polyacrylic acid, polymethacrylic acid or salts thereof.

6. A method of forming a highly dispersed ceramic powder slurry according to claim 1, wherein the polyelectrolyte is ammonium polymethacrylate.

7. A method of forming a highly dispersed ceramic powder slurry according to claim 1 wherein the polyelectrolyte is polymethacrylic acid.

8. A method of forming a highly dispersed ceramic powder slurry according to claim 1 wherein said acidic pH is about 3.0 to about 6.0.

9. A method of forming a highly dispersed ceramic powder slurry according to claim 1 wherein said acidic pH is 4.

10. A method of forming a highly dispersed ceramic powder slurry according to claim 1 wherein the alkaline pH value is about 8 to about 11.

11. A method of forming a highly dispersed ceramic powder slurry according to claim 1 wherein the alkaline pH value is about 9.5.

12. A method of forming a highly dispersed ceramic powder slurry according to claim 1 wherein the ceramic powder has an average particle size of about 10 nanometers to 100 micrometers.

13. A method of forming a highly dispersed ceramic powder slurry according to claim 1 wherein $HNO_3$ is used to adjust the pH to an acidic value.

14. A method of forming a highly dispersed ceramic powder slurry according to claim 1 wherein $NH_4OH$ is used to adjust the pH to an alkaline value.

15. A method of forming a highly dispersed ceramic powder slurry according to claim 1 wherein the concentration of polyelectrolyte is by weight about 250 to about 10,000 parts of polyelectrolyte to one million parts of ceramic powder.

16. A method of forming a highly dispersed ceramic powder slurry according to claim 1 wherein the concentration of ceramic powder in the liquid from which the aqueous base is formed is, by weight, about 5% to about 80%, based on the total weight of ceramic powder and liquid.

17. A method of forming a highly dispersed ceramic powder slurry according to claim 1 wherein said step of treating said slurry to provide for adsorption equilibration to reduce the size and number of agglomerates in the alkaline slurry is an ultrasonic treatment.

18. A method of forming a highly dispersed silicon powder slurry comprising:

(a) forming an aqueous-based slurry of silicon powder and a polyelectrolyte at an acidic pH;

(b) adjusting the pH of the slurry to an alkaline value to provide an alkaline aqueous-based slurry; and (c) treating the slurry to provide for adsorption equilibration to reduce the size and number of agglomerates in the alkaline slurry to thereby form a highly dispersed slurry, wherein the polyelectrolyte is adsorbed on the surface of the silicon powder while the aqueous-based slurry is at an acidic pH.

19. A method of forming a highly dispersed silicon powder slurry according to claim 18 wherein the slurry is formed at an acidic pH by mixing the silicon powder with an aqueous based liquid containing an acid and thereafter adding the polyelectrolyte to the acidic aqueous based liquid containing silicon powder.

20. A method of forming a highly dispersed silicon powder slurry according to claim 18 wherein the slurry is formed at an acidic pH by mixing the polyelectrolyte with an aqueous based liquid containing an acid and thereafter adding the silicon powder to the acidic aqueous based liquid containing polyelectrolyte.

21. A method of forming a highly dispersed silicon powder slurry according to claim 18, wherein the polyelectrolyte is anionic.

22. A method of forming a highly dispersed silicon powder slurry according to claim 18, wherein the polyelectrolyte is polyacrylic acid, polymethacrylic acid or salts thereof.

23. A method of forming a highly dispersed silicon powder slurry according to claim 18, wherein the polyelectrolyte is ammonium polymethacrylate.

24. A method of forming a highly dispersed silicon powder slurry according to claim 18 wherein the polyelectrolyte is polymethacrylic acid.

25. A method of forming a highly dispersed silicon powder slurry according to claim 18 wherein said acidic pH is about 3.0 to about 6.0.

26. A method of forming a highly dispersed silicon powder slurry according to claim 18 wherein said acidic pH is 4.

27. A method of forming a highly dispersed silicon powder slurry according to claim 18 wherein the alkaline pH value is about 8 to about 11.

28. A method of forming a highly dispersed silicon powder slurry according to claim 18 wherein the alkaline value is about 9.5.

29. A method of forming a highly dispersed silicon powder slurry according to claim 18 wherein the silicon powder has an average particle size of about 10 nanometers to 100 micrometers.

30. A method of forming a highly dispersed silicon powder slurry according to claim 18 wherein $HNO_3$ is used to adjust the pH to an acidic value.

31. A method of forming a highly dispersed silicon powder slurry according to claim 18 wherein $NH_4OH$ is used to adjust the pH to an alkaline value.

32. A method of forming a highly dispersed silicon powder slurry according to claim 18 wherein the concentration of polyelectrolyte is by weight about 250 to about 10,000 parts of polyelectrolyte to one million parts of silicon powder.

33. A method of forming a highly dispersed silicon powder slurry according to claim 18 wherein the concentration of silicon powder in the liquid from which the aqueous base is formed is, by weight, about 5% to about 80%, based on the total weight of silicon powder and liquid.

34. A method of forming a highly dispersed silicon powder slurry according to claim 18 wherein said step of treating said slurry to provide for adsorption equilibration to reduce the size and number of agglomerates in the alkaline slurry is an ultrasonic treatment.

35. A method for preparing a ceramic material, comprising the steps of:

(a) forming an aqueous-based slurry of ceramic powder and a polyelectrolyte at an acidic pH;

(b) adjusting the pH of the slurry to an alkaline value to provide an alkaline aqueous-based slurry; and (c) treating the slurry to provide for adsorption equilibration to reduce the size and number of agglomerates in the alkaline slurry to thereby form a highly dispersed slurry; and (d) drying the slurry to thereby prepare a ceramic material, wherein the polyelectrolyte is adsorbed on the surface of the ceramic powder while the aqueous-based slurry is at an acidic pH.

* * * * *